(12) United States Patent
Hemantharaja

(10) Patent No.: US 12,333,827 B2
(45) Date of Patent: Jun. 17, 2025

(54) SYSTEMS AND METHODS FOR DETECTING PROJECTION ATTACKS ON OBJECT IDENTIFICATION SYSTEMS

(71) Applicant: Harman International Industries, Incorporated, Stamford, CT (US)

(72) Inventor: Sharath Yadav Doddamane Hemantharaja, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 323 days.

(21) Appl. No.: 18/002,354

(22) PCT Filed: Jul. 1, 2020

(86) PCT No.: PCT/US2020/040561
§ 371 (c)(1),
(2) Date: Dec. 19, 2022

(87) PCT Pub. No.: WO2022/005478
PCT Pub. Date: Jan. 6, 2022

(65) Prior Publication Data
US 2023/0343108 A1    Oct. 26, 2023

(51) Int. Cl.
*G06V 20/58* (2022.01)
*G06F 18/2413* (2023.01)
(Continued)

(52) U.S. Cl.
CPC .............. *G06V 20/582* (2022.01); *G06T 7/55* (2017.01); *G06T 7/74* (2017.01); *G06V 10/82* (2022.01);
(Continued)

(58) Field of Classification Search
CPC ...... G06V 20/582; G06V 10/82; G06V 20/56; G06V 40/40; G06T 7/55; G06T 7/74;
(Continued)

(56) References Cited

U.S. PATENT DOCUMENTS

2020/0090359 A1*  3/2020  Pillai ...................... G06V 10/82
2021/0004976 A1*  1/2021  Guizilini ................. G06T 7/521
(Continued)

FOREIGN PATENT DOCUMENTS

| CN | 107273788 A | 10/2017 |
| CN | 108765481 A | 11/2018 |
| WO | 2020217087 A1 | 10/2020 |

OTHER PUBLICATIONS

Nassi B. et al. Phantom of the ADAS: Phantom Attacks on Driver-Assistance Systems, Mar. 10, 2020, Ben-Gurion University of the Negev, Georgia Tech (Year: 2020).*
(Continued)

*Primary Examiner* — Chineyere Wills-Burns
*Assistant Examiner* — Lucius Cameron Green Allen
(74) *Attorney, Agent, or Firm* — McCoy Russell LLP

(57) ABSTRACT

Examples are provided for object detection systems for vehicles. In one example, a system for a vehicle includes an image sensor, a processor, and a storage device storing instructions executable by the processor to capture, via the image sensor, an image of an environment of the vehicle, detect an object in the image of the environment of the vehicle, determine whether the object is a projected image of the object, and selectively control one or more vehicle systems of the vehicle to perform one or more actions if the object is not the projected image.

18 Claims, 7 Drawing Sheets

(51) Int. Cl.
*G06T 7/55* (2017.01)
*G06T 7/73* (2017.01)
*G06V 10/82* (2022.01)
*G06V 20/56* (2022.01)
*G06V 40/40* (2022.01)

(52) U.S. Cl.
CPC .............. *G06T 2207/20084* (2013.01); *G06T 2207/30244* (2013.01); *G06T 2207/30252* (2013.01)

(58) Field of Classification Search
CPC . G06T 2207/20084; G06T 2207/30244; G06T 2207/30252; G06F 18/24133
USPC .......................................................... 382/103
See application file for complete search history.

(56) References Cited

U.S. PATENT DOCUMENTS

| | | | | |
|---|---|---|---|---|
| 2021/0034886 | A1* | 2/2021 | Murray | B60W 60/001 |
| 2021/0350222 | A1* | 11/2021 | Ambrus | G06T 7/55 |
| 2021/0398301 | A1* | 12/2021 | Guizilini | G06T 7/70 |
| 2021/0398302 | A1* | 12/2021 | Guizilini | G06T 7/50 |

OTHER PUBLICATIONS

Vorobeychik, Y. et al., "Advanced Machine Learning," Synthesis Lectures on Artificial Intelligence and Machine Learning, vol. 12, No. 3, Aug. 2018, 169 pages.

Nassi, D. et al., "MobilBye: Attacking ADAS with Camera Spoofing," arXiv Cornell University Website, Available Online at https://arxiv.org/abs/1906.09765, Available as Early as Jun. 24, 2019, 6 pages.

Bian, J. et al., "Unsupervised Scale-consistent Depth and Ego-motion Learning from Monocular Video," arXiv Cornell University Website, Available Online at https://arxiv.org/abs/1908.10553, Available as Early as Aug. 28, 2019, 12 pages.

"Phantom of the ADAS: Phantom Attacks on Driving Assistance Systems," YouTube Website, Available Online at https://www.youtube.com/watch?v=1cSw4fXYqWI, Jan. 28, 2020, 4 pages.

Beedham, M., "Tesla's Autopilot dangerously fooled by drone-mounted projectors," The Next Web Website, Available Online at https://thenextweb.com/news/teslas-autopilot-dangerously-fooled-by-drone-mounted-projectors, Feb. 5, 2020, 5 pages.

Füleki, F., "Image-based Depth Estimation with Deep Neural Networks," SmartLab AI Website, Available Online at https://smartlabai.medium.com/image-based-depth-estimation-with-deep-neural-networks-5ae70545ff5f, May 30, 2020, 4 pages.

Nassi, B. et al., "Phantom of the ADAS: Phantom Attacks on Driver-Assistance Systems," Proceedings of the 2020 ACM SIGSAC Conference on Computer and Communications Security, Nov. 9, 2020, Virtual Proceedings, 18 pages.

ISA European Patent Office, International Search Report and Written Opinion Issued in Application No. PCT/US2020/040561, Mar. 26, 2021, WIPO, 17 pages.

State Intellectual Property Office of the People's Republic of China, Office Action and Search Report Issued in Application No. 202080102440.1, Mar. 31, 2025, 28 pages. (Submitted with Partial Translation).

* cited by examiner

SYSTEMS AND METHODS FOR DETECTING PROJECTION ATTACKS ON OBJECT IDENTIFICATION SYSTEMS

CROSS-REFERENCE TO RELATED APPLICATIONS

The present application is a U.S. National Phase of International Application No. PCT/US2020/040561, entitled "SYSTEMS AND METHODS FOR DETECTING PROJECTION ATTACKS ON OBJECT IDENTIFICATION SYSTEMS", and filed on Jul. 1, 2020. The entire contents of the above-listed application are hereby incorporated by reference for all purposes.

FIELD

The disclosure relates to object detection systems in vehicles, including the use of computer vision systems for detecting objects.

BACKGROUND

Intelligent transportation systems (ITS), a component of the ongoing evolution of smart cities, may be used in decision making in traffic planning and traffic management. Cars, traffic lights, drivers, sensors, roadside units, and other public infrastructures form a complex networked system of systems. ITS-based applications may include optimal traffic signal control, safe intersection crossing, and emergency warning notifications, with the goals of enhancing travel efficiency, public safety, emergency response, and even disaster recovery. As the building blocks of an ITS, smart traffic lights, signals, and/or signs are increasingly used in traffic management. Some vehicles, such as autonomous or semi-autonomous vehicles, may utilize imaging systems to detect objects, traffic lights, signals, and/or signs and adjust vehicle operation accordingly.

SUMMARY

The disclosure provides mechanisms for performing real-time detection and recognition of objects traffic lights, signals, and/or signs with robust authentication and verification of detected data to address data security. For example, some traffic sign recognition systems may employ numerous deep learning algorithms to understand the different traffic signs under various image recognition scenarios. However, a challenge for the computer vision based traffic sign recognition systems, recognized by the inventors, is the ability distinguish the original traffic sign signals from fake or hacked ones, which are almost similar to legitimate traffic signals but are actually intended for some other applications and/or result from modification by an unauthorized entity (e.g., displayed by hacking existing traffic signal control systems). Prior algorithms also have challenges in distinguishing between the fake sign signals and original traffic sign signals. In some examples, aspects of the disclosure provide for a cryptography based traffic sign verification system that supplements computer vision-based traffic sign recognition. In some of the disclosed systems, data indicating a traffic sign is secured (e.g., encrypted and/or digitally signed) and transmitted to a vehicle. The vehicle verifies the secured data using a recognized sign from a computer vision system in order to check the authenticity of the computer vision-based recognized sign using cryptographic authentication.

Similar attacks on computer vision-based object detection systems or object identification systems include the projection of images of objects onto surfaces or into the air, for example as a hologram, so that object detection systems may mistake the projection of the object for the object itself. Thus, in some examples, aspects of the disclosure provide for an object detection system that estimates the depth of objects detected by computer vision systems using convolutional neural networks, in order to determine whether the object is a true, physical object, or whether the object is a two-dimensional image of the object that is projected onto a surface or a three-dimensional image of the object (e.g., a hologram) projected in the air.

In one example of a system for a vehicle, the system includes an image sensor, a processor, and a storage device storing instructions executable by the processor to capture, via the image sensor, an image of an environment of the vehicle, detect an object in the image of the environment of the vehicle, determine whether the object is a projected image of the object, and selectively control one or more vehicle systems of the vehicle to perform one or more actions if the object is not the projected image.

In an example of a method for a vehicle, the method includes capturing, via an image sensor, an image of an environment of the vehicle, detecting, with a first neural network, an object in the image, determining, with a second neural network, whether the object is a projected image of the object, selectively controlling one or more vehicle systems of the vehicle to perform one or more actions if the object is not the projected image, and not selectively controlling the one or more vehicle systems of the vehicle to perform the one or more actions if the object is the projected image.

In another example of a method for a vehicle, the method includes capturing, via an image sensor, an image of an environment of the vehicle, detecting, with a first neural network, an object in the image, estimating, with a second neural network, a depth of the object in the image, determining, based on the estimated depth of the object, whether the object is a projected image of the object, selectively controlling one or more vehicle systems of the vehicle to perform one or more actions if the object is not the projected image, and not selectively controlling the one or more vehicle systems of the vehicle to perform the one or more actions if the object is the projected image.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
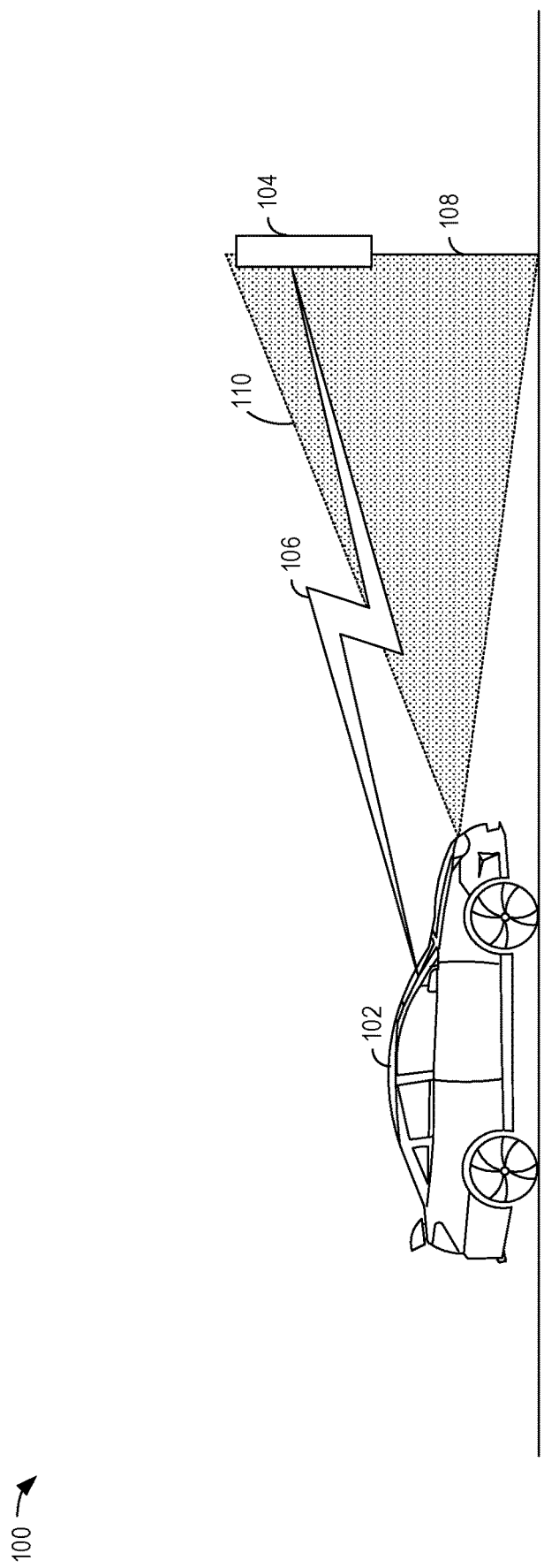
FIG. 1 schematically shows an example environment in which object detection and verification may be performed in accordance with one or more embodiments of the present disclosure.

Some object recognition systems may utilize machine learning to increase accuracy in computer vision-based object recognition. However, existing object recognition systems have not sufficiently addressed various issues related to information and data security of traffic information, including, for example, an issue related to the advancements in the connectivity of traffic systems and traffic signals. Hacker or other cyber-attacks on traffic signal systems at the software level or at the wireless interception level may attempt to modify the traffic signals (used by autonomous or semi-autonomous vehicles, or simply used by vehicle operators or occupants), and which may also be displayed on a traffic sign display screen in the vehicle. Computer vision-based object recognition systems may be unaware of and susceptible to such vulnerabilities in the traffic signal control system, and may focus solely or primarily on performing image processing operations on the obtained images. Any changes in the traffic signal control system that are enacted to change the sign on the display-board of a traffic sign are not visible to other object recognition systems in the vehicles. Without mechanisms to verify the legitimacy of the incoming traffic signals, non-traffic/illegitimate traffic sign signals may infiltrate into the traffic sign recognition systems, which may cause the operators to take incorrect action and which may cause vehicles to operate incorrectly and/or outside of intended traffic rules.

Further, the object recognition systems may further be configured to detect objects other than traffic signal systems, such pedestrians, vehicles, debris in the path of the vehicle, and so on. An advanced driver-assistance system (ADAS) configured with such an object recognition system may alert an operator of a vehicle of the presence of a detected object and/or perform autonomous actions in response to the detected object. However, hacker or other attacks on object recognition systems may attempt to display a false object that will be falsely identified by an object recognition system as a true object. For example, a two-dimensional image of a false object may be projected (e.g., using a projector), painted, pasted, or otherwise positioned or displayed on a surface within the field of view of a vehicle camera. As an illustrative example, an image of a pedestrian or a vehicle may be projected onto the surface of a road in order to fool an object recognition system into classifying the image of the pedestrian or the vehicle as an actual pedestrian or vehicle. Similarly, an image of a traffic sign board (e.g., a speed limit sign) may be projected onto a surface in order to fool an object recognition system into classifying the image of the traffic sign board as an actual traffic sign board. Such false object detections and classifications may cause the operators to take incorrect action and may cause vehicles to operate incorrectly and/or outside of intended traffic rules.

The disclosure addresses, at least partially, one or more of the above issues in object recognition systems by expanding object recognition systems for vehicles to differentiate true objects from false objects. For example, FIG. 1 shows an example environment 100 for performing secured traffic sign detection between a vehicle 102 and an object 104 which may comprise a traffic sign. As used herein, the term "traffic sign" may be used to denote a traffic signal, a traffic light, a traffic sign, and/or any other indicator that may be used in a traffic scenario to control and/or inform vehicles and/or operators on a roadway of a traffic regulation, ordinance, warning, instruction, and so on.

A traffic sign detection system may include a transceiver, where a transmitter is housed in the traffic sign 104 and/or accessible by the traffic sign 104. The transmitter may emit digital cryptographic information (represented by transmission signal 106) using an antenna which is mounted on a traffic signal pole 108 and/or otherwise mounted on or near the traffic sign 104, and a vehicle receiver receives the digital information using an antenna which is mounted on the vehicle. The digital transmitted information may be the cryptographic representation of the corresponding traffic sign 104 which is displayed on an associated traffic signal display. The cryptographic representation distinguishes the one traffic sign from another using a unique ID which is assigned to each traffic signs separately. In a non-limiting example, when a STOP sign is displayed on the traffic display of traffic sign 104, then the transmitter transmits the cryptographic representation of the unique ID which is assigned to STOP sign.

The received cryptographic representation of the traffic sign which is transmitted using the transmitter is received at the vehicle 102 and the cryptographic information is verified inside a vehicular infotainment system/vehicular processor of the vehicle 102.

The vehicle 102 further includes a camera (not shown) with a field of view 110. An object recognition system processes camera images acquired by the camera to detect and classify objects within the field of view 110, such as the traffic sign 104 as depicted. The verification of the cryptographic information may include verifying the traffic sign recognized by a computer vision system of the vehicle using the received cryptographic representation. For example, the vehicle 102 may include one or more cameras that are configured to image a region of an environment around the vehicle (e.g., represented by field of view 110), where the resulting images are processed to locate traffic signs in the image data. Any traffic signs recognized in the image data may be used with received cryptographic data in order to verify and/or authenticate a computer vision-recognized traffic sign. Using the above non-limiting example, if the computer vision-based object recognition system in the vehicle 102 recognizes the traffic sign 104 as a STOP sign, then the vehicle performs a cryptographic authentication of the received signal using information for a STOP ID associated with the computer vision recognized STOP sign. If the cryptographic authentication using the STOP ID is successful, the traffic sign is considered as an authenticated one, otherwise the traffic sign is considered as a fake/false signal.

Figure 2:
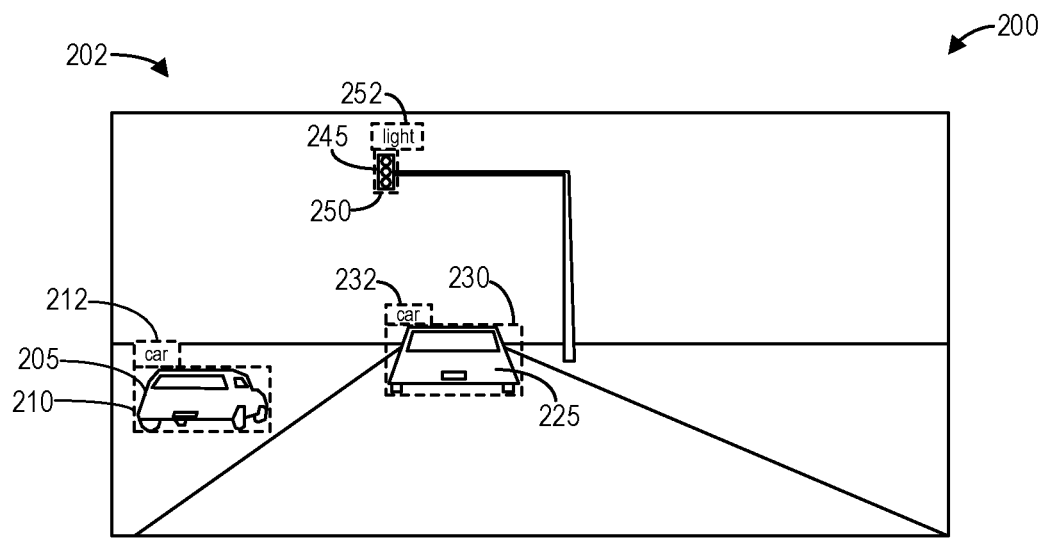
FIG. 2 shows an example camera image depicting automatically-detected objects in accordance with one or more embodiments of the present disclosure.

In addition to detecting and classifying traffic signs, the computer vision-based object recognition system may further detect and classify other objects such as pedestrians, motorists, vehicles, debris, and so on within the field of view. For example, FIG. 2 shows an example camera image 200 depicting a plurality of automatically-detected objects 202. The object recognition system automatically detects and classifies objects within the camera image 200, such as the object 205 which comprises a car as depicted. As depicted, the object recognition system generates a region of interest for each detected object, such as the region of interest 210 that bounds the region in the camera image 200 containing the detected object 205. The object recognition system further classifies each object, and may further add a label 212 of the classification to each detected object. For example, as depicted, the plurality of automatically-detected objects 202 includes the car 205, a second car 225, and a traffic light 245. The object recognition system or object detection systems described herein may be configured to generate corresponding regions of interest 210, 230, and 250 for the objects 205, 225, and 245. Further, the object recognition system further classifies the detected objects 205, 225, and 245 with labels 212, 232, and 252, respectively. As depicted, the object recognition system classifies the object 205 as with a label 212 indicating the object is a car, while the second car 225 is classified with a label 232 indicating the object is a car, and the traffic light 245 is classified with a label 252 indicating the object is a traffic light. In this way, an ADAS system may monitor the behavior of such detected objects relative to the vehicle such that the ADAS system may perform one or more actions responsive to one or more of the detected objects (e.g., by adjusting speed relative to one or more of the detected vehicles 205 or 225, or responsive to a change in the signal by the traffic light 245).

Figure 3:
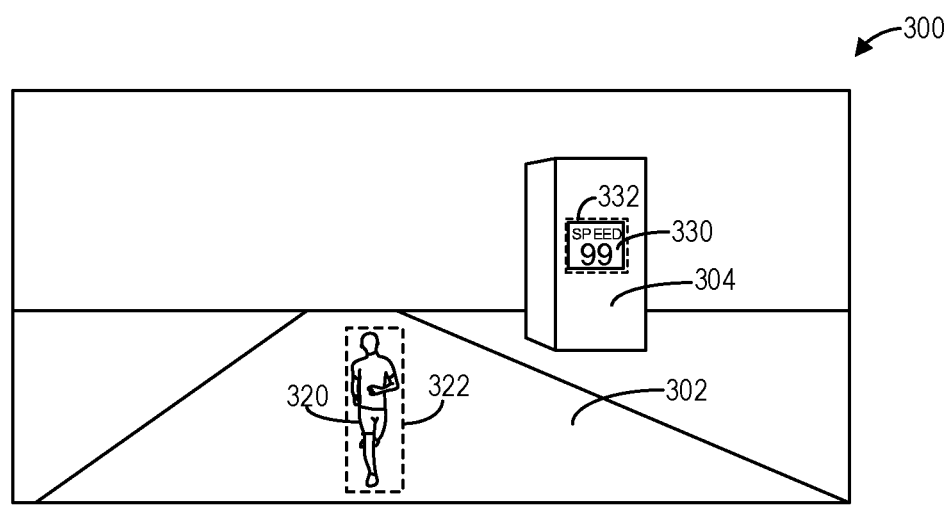
FIG. 3 shows an example camera image depicting detection of projected objects in accordance with one or more embodiments of the present disclosure.

However, as discussed hereinabove, such object recognition systems may incorrectly detect and classify a projection (e.g., a two-dimensional image) of an object as the object itself. As an illustrative example, FIG. 3 shows an example camera image 300 depicting detection of projected objects. The camera image 300 depicts a road 302 and a building 304. Further, as depicted, an image 320 of a person is projected onto the road 302. Similarly, an image 330 of a traffic sign is projected onto the building 304. The same object recognition system for detecting objects as depicted in FIG. 2 may detect the images 320 and 330, and generate regions of interest 322 and 332 that bound the images 320 and 330 respectively in the camera image 300. Further, the images 320 and 330 may be accurately classified respectively as a pedestrian and a traffic sign.

However, the images 320 and 330 are projected onto the surface of the road 302 and the surface of the building 304, respectively, and do not correspond to an actual pedestrian or an actual traffic sign. In the depicted example, the image 330 depicts a false traffic sign indicating a speed limit that is potentially incorrect. In such an example, if the false traffic sign depicted by the image 330 is classified by an object recognition system as a true traffic sign, the vehicle may accelerate or decelerate to the incorrect speed depicted by the image 330 if the vehicle is operating in an operating mode that is at least partially autonomous. Similarly, if the image 320 of the pedestrian is classified as an actual pedestrian in the middle of the road 302, the vehicle may generate a warning to the operator of the vehicle of the pedestrian and/or may adjust operation (e.g., by adjusting vehicle velocity) in consideration of the image 320 of the pedestrian.

Figure 4:
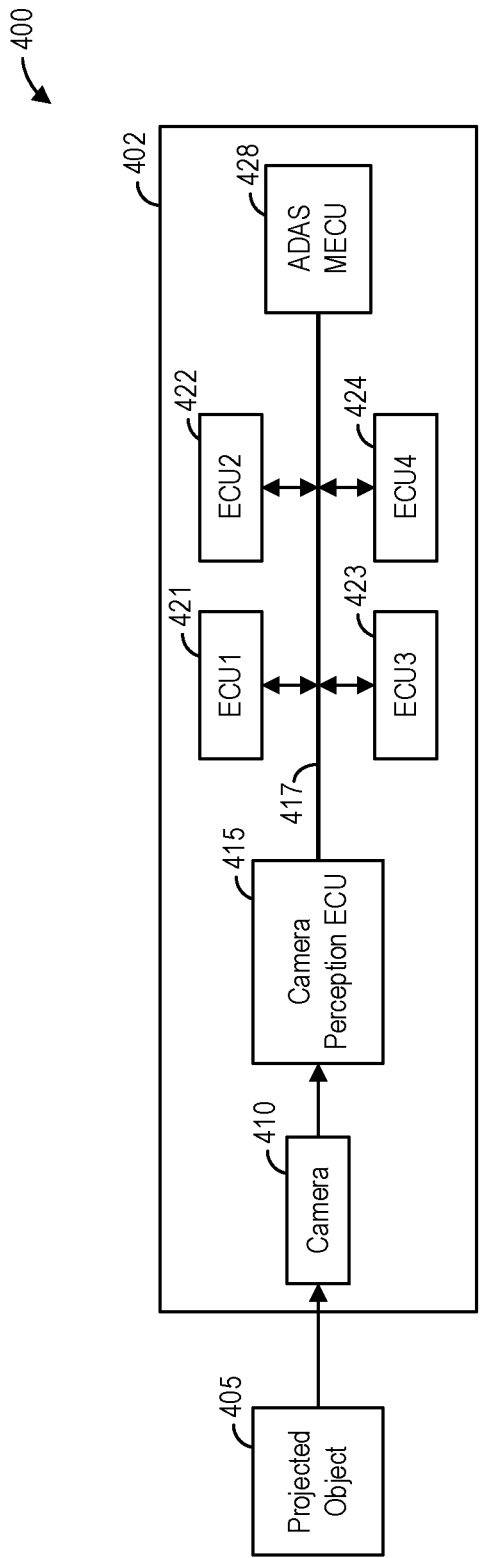
FIG. 4 shows a block diagram illustrating an example electronic control system (ECU) including a camera perception ECU for detecting projected objects in accordance with one or more embodiments of the present disclosure.

FIG. 4 shows a block diagram illustrating an example advanced driver-assistance system (ADAS) electronic control unit (ECU) system 400 for a vehicle 402 including a camera perception ECU 415 for detecting objects including a projected object 405 in an image acquired by a camera 410 in accordance with one or more embodiments of the present disclosure. The ADAS ECU system 400 assists a driver or operator of the vehicle 402 in controlling the vehicle 402, in identifying other vehicles and driving hazards, and in simultaneously managing multiple vehicle systems. In this way, the ADAS ECU system 400 reduces the burden on the operator for operating the vehicle 402, and provides detailed information about the environment of the vehicle 402 that otherwise may not be apparent to the operator. As illustrative and non-limiting examples, the ADAS ECU system 400 may provide an adaptive cruise control (ACC) system that automatically adjusts vehicle speed when following another vehicle, and a lane keep assist (LKA) system that applies torque to a steering wheel (not shown) of the vehicle 402 to aid the operator in maintaining a driving lane. In general, the ADAS ECU system 400 detects objects in the environment of the vehicle 402 (e.g., other vehicles, pedestrians, lane markers, traffic signs, debris, and so on) and controls one or more vehicle systems in response to the detected objects (e.g., by performing adaptive cruise control, controlling steering and braking systems, performing corrective and/or evasive maneuvers, alerting the operator of the vehicle 402 to detected objects, and so on).

To that end, the ADAS ECU system 400 includes a plurality of ECUs, including the camera perception ECU 415 configured to process camera images acquired by the camera 410. An example system for a camera perception ECU 415 is described further herein with regard tin FIG. 5. The camera perception ECU 415 is communicatively coupled to other ECUs of the vehicle 402 via a bus 417 which may comprise an engine controller area network (CAN) bus. For example, the ADAS ECU system 400 comprises a plurality of ECUs including a first ECU (ECU1) 421, a second ECU (ECU2) 422, a third ECU (ECU3) 423, and a fourth ECU (ECU4) 424, wherein each ECU may be dedicated to controlling different systems or subsystems of the vehicle 402. For example, the ECUs 421, 422, 423, 424 may comprise an engine control unit, a transmission control unit, a brake control unit, a telematics control unit, a speed control unit, a door control unit, and so on. The ADAS ECU system 400 further includes an ADAS master ECU (MECU) 428 for coordinating control of the vehicle subsystems via the other ECUs of the ADAS ECU system 400.

Each ECU of the ADAS ECU system 400 may comprise a processor, such as a microprocessor, and a memory, such as a non-transitory memory. In some examples, the ADAS ECU system 400 may include an additional digital storage device comprising non-transitory memory that is communicatively coupled to one or more ECUs of the ADAS ECU system 400, for example via the bus 417.

The camera 410 may comprise an ADAS camera configured to acquire images of the environment around the vehicle 402 for assisting the ADAS ECU system 400. As an example, the camera 410 may be positioned in a forward-facing position with respect to the vehicle 402, such that the field of view of the camera 410 is directed in front of the vehicle 402. The ADAS ECU system 400 may include additional cameras such as camera 410 oriented in different directions with respect to the vehicle, such as a rear-view camera. In some examples, the camera 410 may comprise multiple cameras arranged, for example, as a stereo camera system adapted to determine three-dimensional representations of the surrounding environment. However, in some examples, the camera 410 may comprise a single camera such as an image sensor adapted to acquire two-dimensional images of the surrounding environment.

The camera 410 may thus include one or more image sensors mounted on or in the vehicle 402 for imaging an environment of the vehicle 402. The camera 410 may include a rear-view camera(s), a front-view camera(s), a side-view camera(s), a camera(s) with a wide field of view (e.g., a camera with a field of view that is greater than 180 degrees), and/or any other suitable camera associated with the vehicle 402. In addition to being used to image traffic signs, one or more of the cameras 410 may also be used to provide obstacle detection, lane recognition, surround-view imaging for display within the vehicle, and/or other imaging tasks.

The camera 410 may acquire an image of the environment outside of the vehicle 402 which may include one or more objects including the projected object 405. The camera perception ECU 415 receives or obtains the image of the projected object 405 via the camera 410, and processes the image to detect the projected object 405. The camera perception ECU 415 may classify the projected object 405, for example as a vehicle, pedestrian, traffic sign, and so on, as well as detect the position of the projected object 405 relative to the vehicle 402. The camera perception ECU 415 may output the classification of the projected object 405 and the relative position of the projected object 405 to the bus 417 so that the ADAS MECU 428 and/or another ECU may control one or more vehicle systems responsive to the detection of the projected object 405. In this way, if the projected object 405 were a true object (i.e., an actual physical object as opposed to a false, projected image of an object), then the ADAS ECU system 400 may control one or more vehicle systems to perform one or more actions in response to the object.

However, if the object detected by the camera perception ECU 415 is the projected object 405 (i.e., a two- or three-dimensional image of an object), then the ADAS ECU system 400 may not perform the one or more actions that the ADAS ECU system 400 would perform if the projected object 405 were a true object. For example, the ADAS ECU system 400 may control the vehicle 402 to a reduced velocity in response to detecting a pedestrian in front of the vehicle 402 or in response to detecting a traffic sign indicating a lower speed limit, but if the pedestrian and/or the traffic sign are projected objects, for example as depicted in FIG. 3, then the ADAS ECU system 400 may instead identify that the objects are projected objects 405 and not control the vehicle system to reduce velocity of the vehicle 402.

Figure 5:
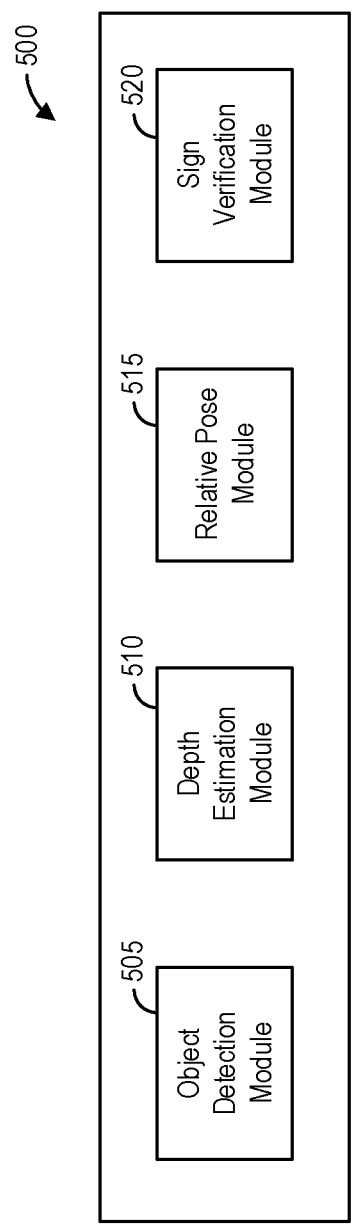
FIG. 5 shows a block diagram illustrating an example system for detecting and verifying objects in camera images in accordance with one or more embodiments of the present disclosure.

To that end, FIG. 5 shows a block diagram illustrating an example system 500 for detecting and verifying objects in camera images in accordance with one or more embodiments of the present disclosure. The system 500 may be implemented via the camera perception ECU 415, as an illustrative example. The system 500 comprises an object detection module 505 configured to detect and classify objects in camera images acquired via the camera 410, a depth estimation module 510 configured to estimate the depth of objects in the camera images, a relative pose module 515 configured to estimate a relative camera pose between camera images, and a sign verification module 520 configured to verify the authenticity of a traffic sign.

The object detection module 505 is configured to detect and classify objects that are present in images captured by the camera 410 using one or more deep-learning computer-vision algorithms. As illustrative and non-limiting examples, the object detection module 505 may comprise and/or utilize one or more deep-learning computer-vision algorithms for object detection such as a convolutional neural network (CNN), region CNN, fast region CNN, faster region CNN, a you-only-look-once (YOLO) approach, single-shot detector (SSD), and so on. For example, the object detection module 505 may comprise a convolutional neural network configured to perform convolution operations on camera images acquired by the camera 410 to extract features, and further to predict a bounding box of objects (such as the bounding boxes or regions of interest depicted in FIGS. 2 and 3). The object detection module 505 comprising a CNN, for example, may be trained to identify and/or classify objects including but not limited to traffic signs, vehicles, pedestrians, drivers, debris, traffic markings, and so on.

One issue with detecting objects in the camera images is that the camera 410 may not comprise a three-dimensional camera system or a stereo camera system capable of identifying the three-dimensional shape of the objects in the camera images. For example, as mentioned hereinabove, the object detection module 505 may not be able to differentiate a two-dimensional image of an object projected onto a surface or a three-dimensional hologram of an object projected in the air from an actual object in the environment surrounding the vehicle. Notably, such false objects (i.e., two-dimensional images of objects or three-dimensional holograms of objects) do not have a measurable depth with respect to the horizontal distance from the camera 410 from the vehicle 402. The depth estimation module 510 therefore estimates the depth of objects detected by the object detection module 505 to determine whether the objects are true objects or false objects. The depth estimation module 510 comprises a depth estimation neural network, also referred to herein interchangeably as a depth estimation network or a depth net, configured to accept a camera image as input and output a depth map indicating an estimated depth for each pixel, for example, of the camera image. As the depth of projected two-dimensional images is zero and the depth of a projected three-dimensional object (e.g., a hologram) does not exist, the system 500 may thus determine whether a detected object is a true object or a false object based on the estimated depth of the object within the camera image. For example, if the estimated depth of an object does not change from one image frame to the next image frame even if the position of the camera changes between acquisition of the image frames (e.g., due to the vehicle moving), then the system 500 may determine that the object is a false object.

The relative pose module 515 comprises a relative pose neural network, also referred to herein as a relative pose network or a pose net, configured to accept consecutive image frames acquired via a camera as input and output the relative pose between the image frames. The relative pose network may comprise a convolutional neural network, as an illustrative and non-limiting example. The relative pose module 515 enables the depth estimation module 510 to learn depth in a completely unsupervised fashion, based on ego-motion in image frames acquired by the camera. For example, given two consecutive image frames from the camera, the neural network(s) of the depth estimation module 510 produce single-view depth estimates for each frame, while the relative pose module 515 estimates ego-motion between the frames. The depth estimation networks of the depth estimation module 510 may be trained by optimizing the networks such that the depth and ego-motion estimates from adjacent frames are consistent, as described further herein with regard to FIGS. 7 and 8.

Together, the depth estimation module 510 and the relative pose module 515 enable the system 500 to obtain depth information of objects detected by the object detection module 505 by converting the two-dimensional detected objects into a three-dimensional construction using image data from a single image sensor. In this way, rather than using a stereo camera system which may leverage parallax to determine depth of an object relative to the vehicle, or a LiDar system which may leverage reflected light to determine the depth or distance of objects from the vehicle, the system 500 may determine the depth of an object relative to the vehicle with a single camera.

The sign verification module 520 is configured to verify or authenticate traffic signs detected by the object detection module 505. For example, as traffic sign boards may have zero depth, the sign verification module 520 may verify whether a detected object classified by the object detection module 505 as a traffic sign is an authentic traffic sign. As an illustrative example, the sign verification module 520 comprise a cryptography-based traffic sign verification (CTRV) module. An antenna of the vehicle may be configured to receive information, such as the cryptographic representation of a traffic sign signal that is provided to control an output of the traffic sign and/or other cryptographic representations of traffic sign signals received from other traffic signs, wirelessly. The received information may be passed to the sign verification module 520 for processing in order to determine a traffic sign associated with (e.g., indicated by) the received information. For example, the sign verification module 520 may perform a verification of the received data (e.g., signature verification), decrypt the received information, and parse the decrypted information to confirm an identity associated with the associated traffic sign. The decrypted information may be compared to a database of traffic sign identifiers (e.g., stored locally at the vehicle and/or in a cloud-based storage device) in order to determine whether the transmitted data was corrupted during transmission (e.g., if the decrypted information matches the stored traffic sign identifier, the data was uncorrupted during transmission). The sign verification module 520 may provide the results of the cryptography-based traffic sign verification to a validated traffic sign indicator (not shown), which outputs a signal (e.g., to one or more vehicle systems, such as a display controller, a processor, an engine controller, etc.) indicating whether or not the traffic sign recognized by the object detection module 505 is valid. For example, if the traffic sign recognized by the object detection module 505 is indicated to be valid (e.g., if the one or more vehicle systems receive an output from the validated traffic sign indicator indicating a successful decryption of the received cryptographic data followed by an ID comparison with the unique IDs stored locally in the vehicle), the one or more vehicle systems may proceed to control vehicle operation based on the recognized traffic sign (e.g., provide an automated response to the traffic sign, such as outputting an indicator of the traffic sign, adjusting autonomous operation of the vehicle to conform to the regulations and/or traffic control indicated by the traffic sign, etc.). Otherwise, if the traffic sign recognized by the object detection module 505 is indicated to be not valid (e.g., if the one or more vehicle systems receive an output from the validated traffic sign indicator indicating that the decryption of the received cryptographic data was not successful), the one or more vehicle systems may not alter or control vehicle operations based on the recognized traffic sign and optionally may output a warning to the driver and/or to a traffic authority service to indicate that the traffic sign is potentially compromised.

Figure 6:
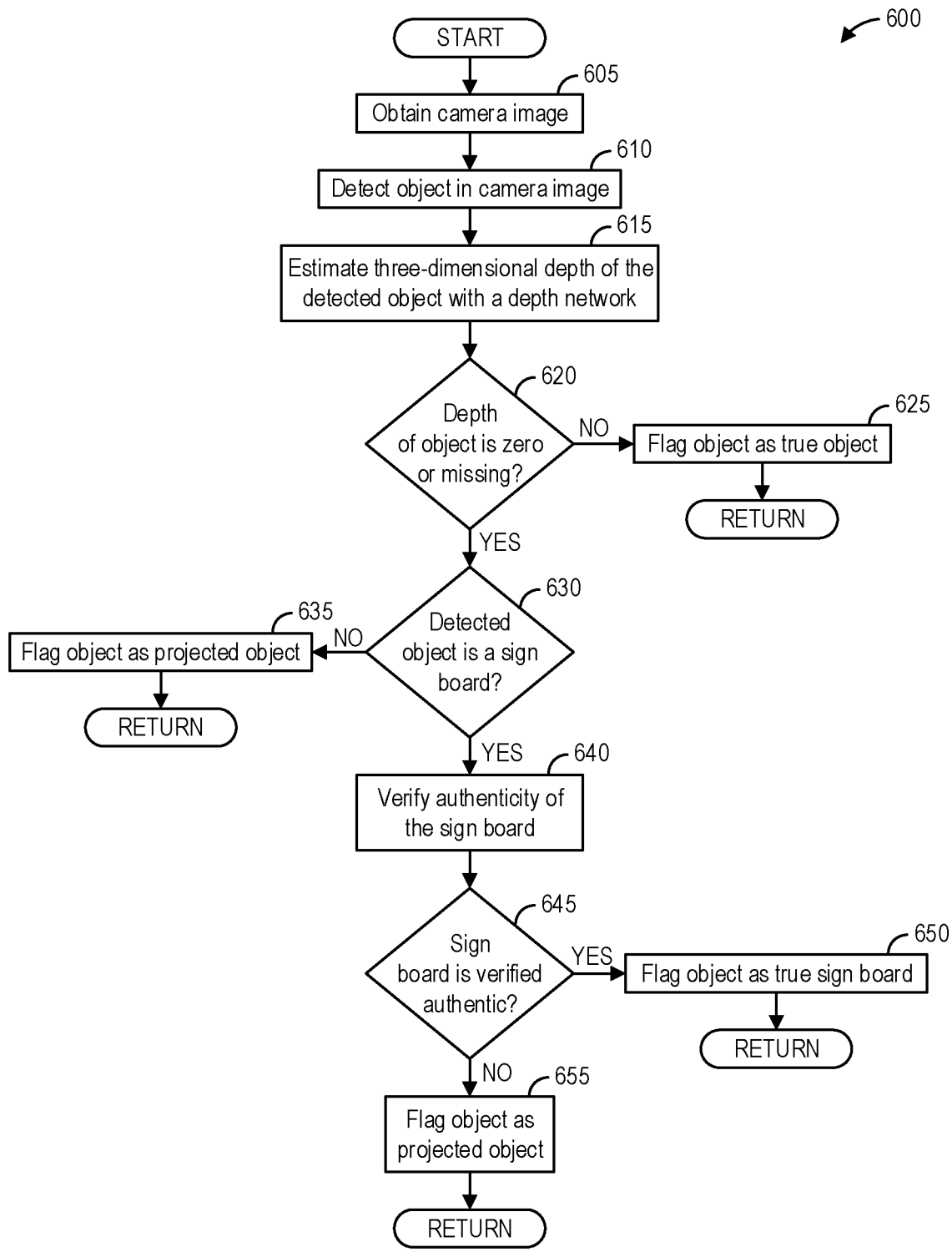
FIG. 6 shows a high-level flow chart illustrating an example method for verifying detected objects in camera images in accordance with one or more embodiments of the present disclosure.

FIG. 6 shows a high-level flow chart illustrating an example method 600 for verifying detected objects in camera images in accordance with one or more embodiments of the present disclosure. In particular, method 600 relates to evaluating whether an object automatically detected via computer vision is the actual object or a projection of the object. Method 600 is described with regard to the systems and components of FIGS. 1, 4, 5, and 9, though it should be appreciated that the method 600 may be implemented with other systems and components without departing from the scope of the present disclosure. Method 600 may be implemented as executable instructions in non-transitory memory of an ECU system, such as the ADAS ECU system 400, and may be executed by one or more processors, such as a processor of the camera perception ECU 415.

Method 600 begins at 605. At 605, method 600 obtains a camera image, for example via the camera 410. The camera image comprises a two-dimensional image of an environment exterior to the vehicle. At 610, method 600 detects an object in the camera image. For example, method 600 may input the camera image to the object detection module 505 to detect one or more objects in the camera image. A trained machine learning model, such as a convolutional neural network, of the object detection module 505 receives the camera image as input and generates an output comprising a bounding box or region of interest containing a potential object. The output may further comprise a classification of the potential object, for example indicating that the potential object is a pedestrian, vehicle, rider, traffic light, traffic sign board, debris, and so on.

At 615, method 600 estimates a three-dimensional depth of the detected object with a depth estimation neural network. For example, method 600 may input the camera image to the depth estimation module 510 to estimate the three-dimensional depth of each detected object in the camera image. The depth estimation module 510 processes the two-dimensional camera image to determine the depth, or relative distance from the camera 410, of each pixel of the camera image or at least each pixel corresponding to the detected object. In some examples, the depth of the detected object may be further determined based on a previous depth estimated for the detected object in a preceding camera image. In this way, by monitoring the estimated depth of a projected object from frame to frame, a projected object that may appear to have depth may be identified as a projected object when the depth does not change despite ego-motion.

At 620, method 600 determines whether the depth of the object is zero or is missing. If the depth of the object is not zero or missing ("NO"), method 600 continues to 625. At 625, method 600 flags the object as a true object. By flagging the object as a true object and outputting this flag of the object as a true object, the ADAS ECU system 400 may control one or more vehicle systems in consideration of the object. Method 600 then returns.

However, referring again to 620, if the depth of the object is zero or is missing ("YES"), method 600 proceeds to 630. At 630, method 600 determines whether the detected object is classified as a sign board, such as a traffic sign board. Such an object may have zero depth while still comprising a true object. If the detected object is not classified as a sign board ("NO"), method 600 continues to 635. At 635, method 600 flags the object as a projected object or a false object. Thus, if an object does not have depth and is not classified as a two-dimensional traffic sign, method 600 classifies the object as a projected object. In this way, other ECUs may not control one or more vehicle systems in response to the projected object. For example, an ECU for performing adaptive cruise control may not adjust speed in response to an image of a vehicle projected onto the road, despite the image initially being classified as a vehicle by an object detection network. Method 600 then returns.

However, referring again to 630, if the detected object is a sign board ("YES"), method 600 continues to 640. At 640, method 600 verifies the authenticity of the sign board. For example, method 600 may cryptographically verify the authenticity of the traffic sign board, via the sign verification module 520, based on encrypted signals received from a transceiver associated with the sign board. As another example, method 600 may query a database storing valid traffic signs and positions of such valid traffic signs, for example based on a current location of the vehicle and/or the detected sign board determined according to GPS data, to validate the authenticity of the sign board as a traffic sign board.

At 645, method 600 determines whether the sign board is verified as authentic. If the sign board is verified as authentic ("YES"), method 600 continues to 650. At 650, method 600 flags the object as a true sign board. Method 600 then returns.

However, referring again to 645, if the sign board is not verified as authentic ("NO"), method 600 continues to 655. At 655, method 600 flags the object as a projected object. In this way, method 600 may distinguish valid two-dimensional objects, such as a traffic sign, from invalid two-dimensional objects, such as projections of objects onto a surface or in the air. Method 600 then returns.

Thus, method 600 evaluates each detected object in a camera image to determine whether the object is a true object or a false object. In this way, an ADAS ECU system such as the ADAS ECU system 400 may control one or more vehicle systems in response to detecting true objects, while ignoring false objects. Further, even if an object is determined to be a false object or a projected object, the ADAS ECU system 400 may generate an alert to the operator of the vehicle in order to further verify the validity of the detected object.

Figure 7:
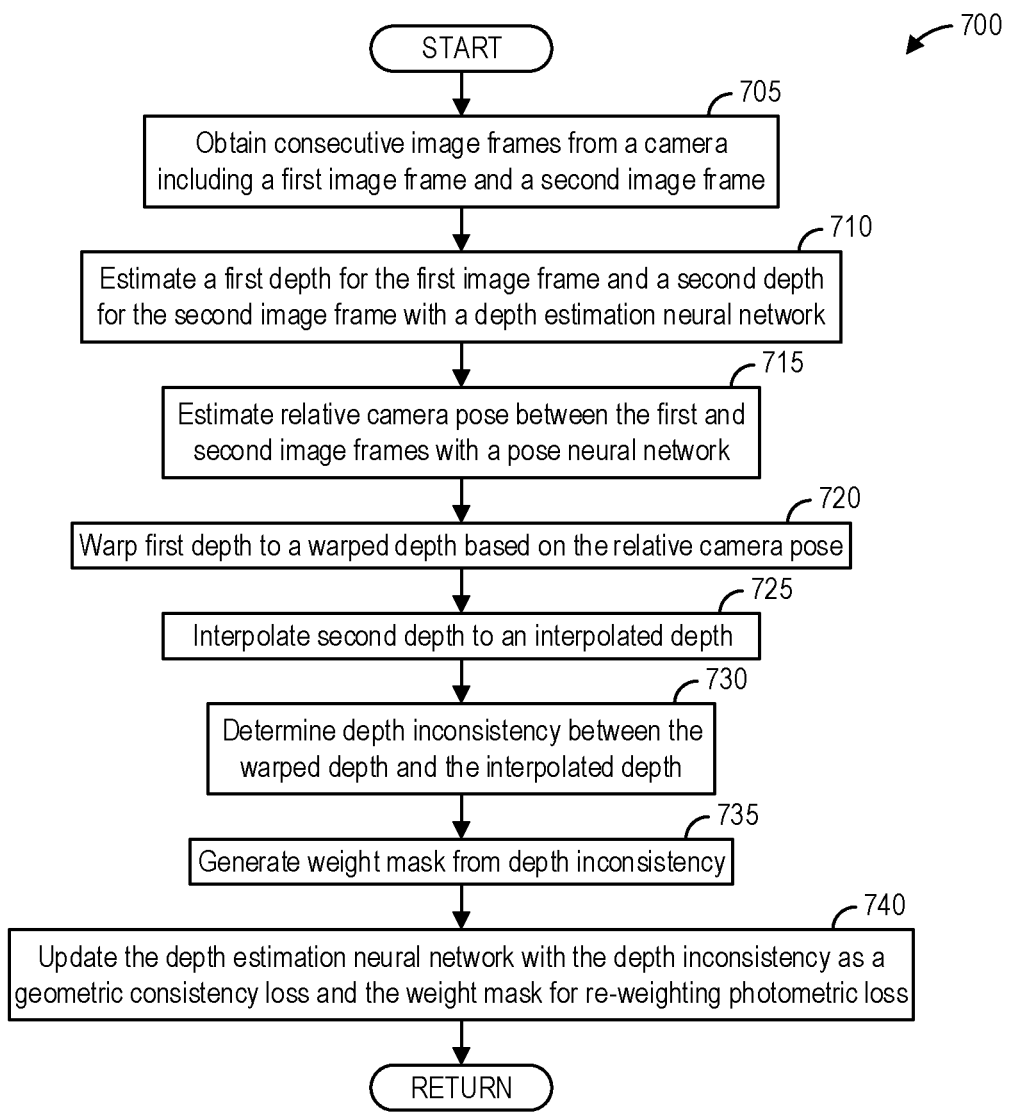
FIG. 7 shows a high-level flow chart illustrating an example method for unsupervised training of a depth estimation neural network in accordance with one or more embodiments of the present disclosure.

FIG. 7 shows a high-level flow chart illustrating an example method 700 for unsupervised training of a depth estimation neural network in accordance with one or more embodiments of the present disclosure. In particular, method 700 relates to the continuous unsupervised training of a depth estimation neural network, such as a depth estimation neural network of the depth estimation module 510, to improve depth estimation of objects depicted in two-dimensional images acquired by a single camera or image sensor. Method 700 may be implemented as executable instructions in non-transitory memory of the camera perception ECU 415, for example, and may be executed by a processor or microprocessor of the camera perception ECU 415 to perform the actions described herein.

Method 700 begins at 705. At 705, method 700 obtains consecutive image frames from a camera including a first image frame $I_1$ and a second image frame $I_2$. Each image frame comprises a two-dimensional image. At 710, method 700 estimates a first depth $D_1$ for the first image frame and a second depth $D_2$ for the second image frame with a depth estimation neural network of the depth estimation module 510.

At 715, method 700 estimates a relative camera pose $P_{12}$ between the first and second image frames with a pose neural network. To enforce geometric consistency on the predicted results, at 720, method 700 warps the first depth $D_1$ to a warped depth $D_2^1$ based on the relative camera pose $P_{12}$, for example by converting the first depth D1 to a three-dimensional space and projecting the first depth $D_1$ in the three-dimensional space to the image plane of the second image 12 using the relative camera pose $P_{12}$. Further, at 725, method 700 interpolates the second depth $D_2$ to an interpolated depth $D_2'$.

At 730, method 700 determines a depth inconsistency $D_{diff}$ between the warped depth and the interpolated depth. For example, method 700 may determine the depth inconsistency by calculating:

$$D_{diff} = \frac{|D_2^1 - D_2'|}{|D_2^1 + D_2'|}.$$

At 735, method 700 generates a weight mask M from the depth inconsistency, for example by calculating:

$$M = 1 - D_{diff}.$$

At 740, method 700 updates the depth estimation neural network with the depth inconsistency as a geometric consistency loss and the weight mask for re-weighting photometric loss. In particular, the geometric consistency loss $L_{GC}$ is defined as the average of the depth inconsistency map for all valid points that are successfully projected from the first image frame $I_1$ to the image plane of the second image frame 12. With training, the consistency can be propagated to the entire video sequence. Further, the weight mask enables the depth net to handle moving objects and occlusions that may impair the network training, as the weight mask assigns high/low weights for inconsistent/consistent pixels. Method 700 then returns.

Figure 8:
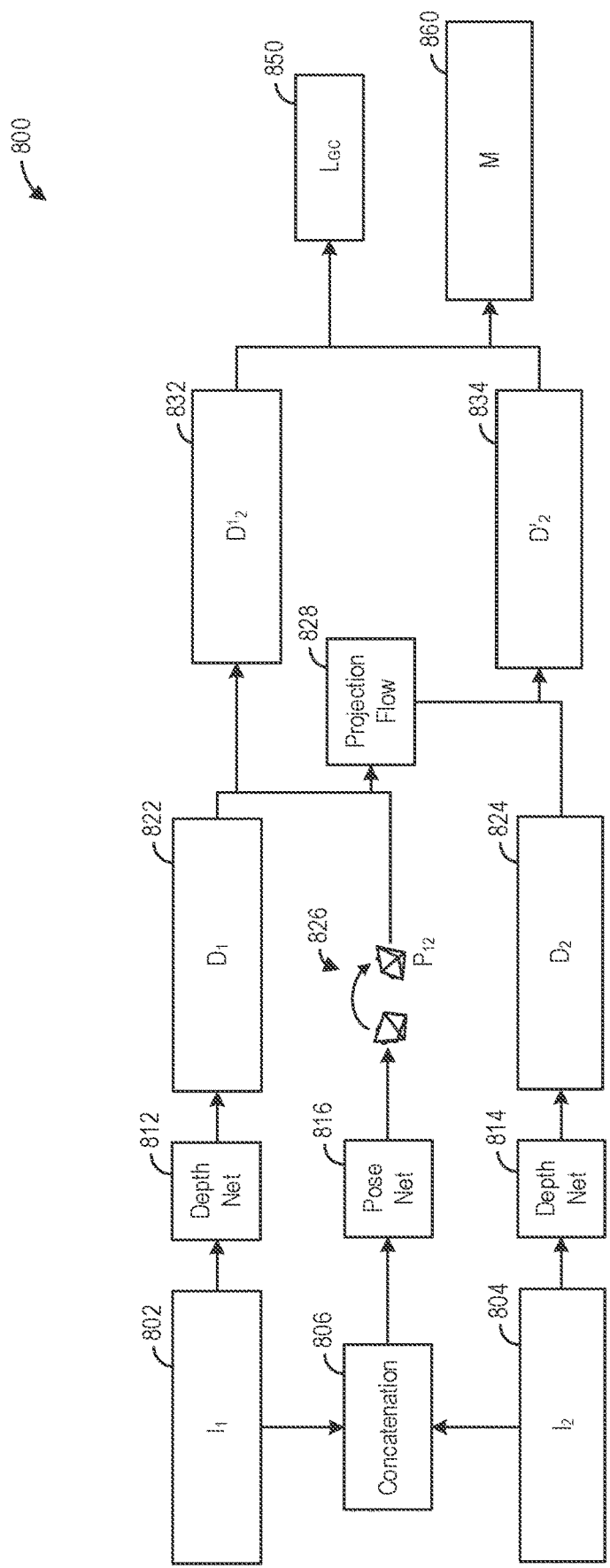
FIG. 8 shows a block diagram illustrating an example method for unsupervised training of a depth estimation neural network in accordance with one or more embodiments of the present disclosure.

To further illustrate the method 700, FIG. 8 shows a block diagram illustrating an example method 800 for unsupervised training of a depth estimation neural network in accordance with one or more embodiments of the present disclosure. The method 800 corresponds to the method 700 described hereinabove. As depicted, method 800 includes obtaining consecutive images from a single camera including a first image frame 802 and a second image frame 804.

The first image frame 802 and the second image frame 804 are concatenated 806 and the concatenated image frames are input to a pose network 816. As an illustrative and non-limiting example, the target view is concatenated 806 with all source views along the color channels. If the first image frame 802 is acquired prior to the second image frame 804, then the second image frame 804 is the target view. With the concatenated image frames as input, the pose network 816 predicts the relative camera pose 826 between the first image frame 802 and the second image frame 804. The relative camera pose 826 may comprise the relative rotation and translation of the camera between acquisition of the first image frame 802 and the second image frame 804. The pose network 816 comprises a neural network such as the relative pose network 515 described hereinabove. For example, the pose network 816 may include convolutional layers and deconvolutional layers arranged to predict a relative pose between the image frames. As an illustrative and non-limiting example, the first convolutional layer may include sixteen output channels, the kernel size for the first two convolutional layers may comprise seven and five respectively, the kernel size for the last two deconvolution/prediction layers may comprise five and seven respectively, and the kernel size for remaining layers may comprise three. Global average pooling is applied to aggregate predictions at all spatial locations. Further, all convolutional layers are followed by a rectified linear unit (ReLU) except for the last layer where no nonlinear activation is applied.

Meanwhile, the first image frame 802 is input to a depth estimation network 812 which outputs a first depth estimate 822, and the second image frame 804 is input to a depth estimation network 814 which outputs a second depth estimate 824. The depth estimation networks 812 and 814 may comprise a same depth estimation network, duplicates of the same depth estimation network, or different depth estimation networks.

In order to force geometric consistency on the predicted results so that the depth estimates of the first image frame 802 and the second image frame 804 conform to the same three-dimensional structure, the first depth estimate 822 and the second depth estimate 824 are adjusted. In particular, the first depth estimate 822 is warped to a warped depth estimate 832 by converting the first depth estimate 822 to three-dimensional space and projecting to the image plane of the second image frame 804. Further, the second depth estimate 824 is interpolated, based on projection flow 828 obtained from the first depth 822 and the relative pose 826, to an interpolated depth estimate 834. The loss $L_{GC}$ 850 is determined from the depth inconsistency between the warped depth estimate 832 and the interpolated depth estimate 834 as described hereinabove. Further, a weight mask 860 is calculated from the depth inconsistency.

Figure 9:
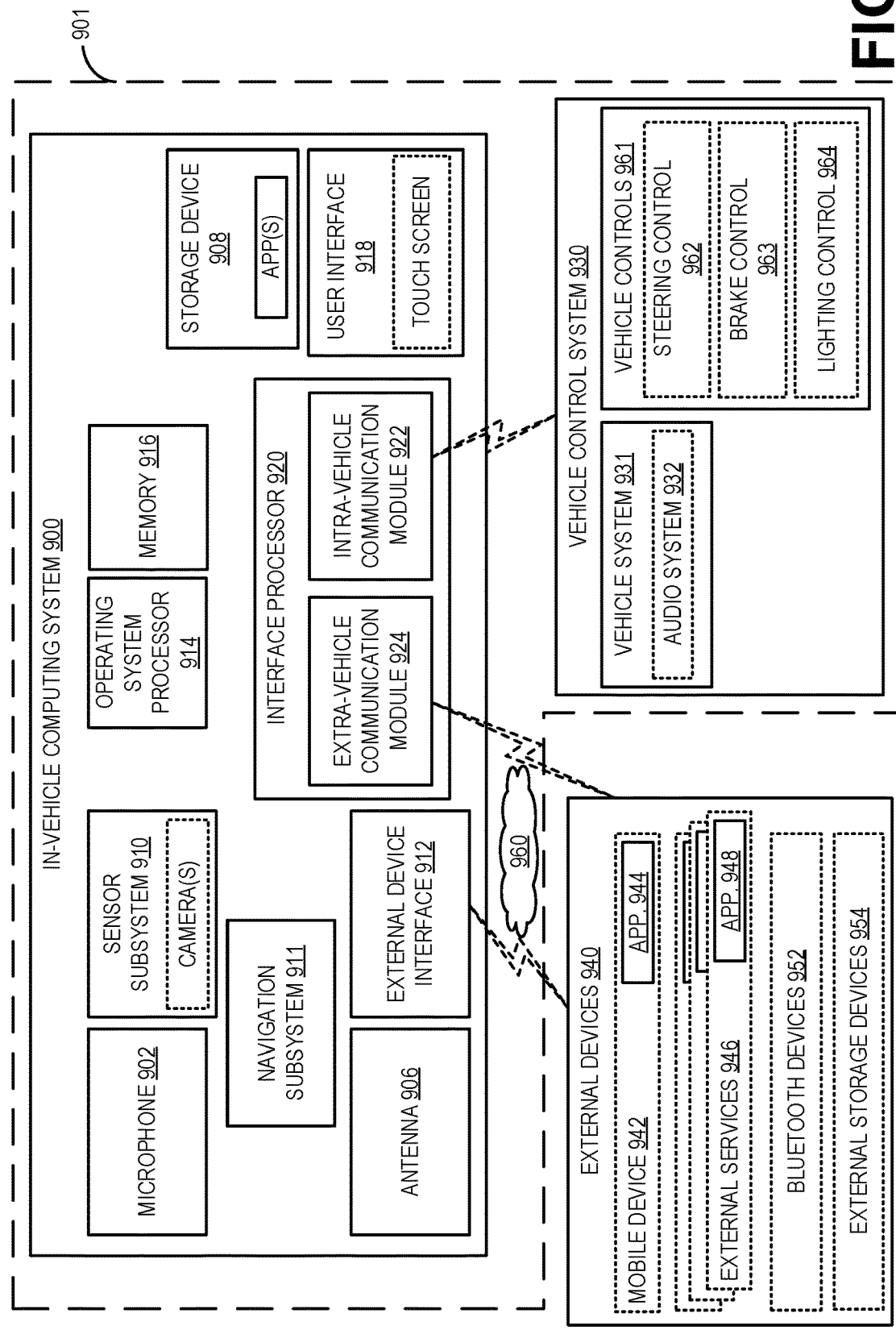
FIG. 9 shows a block diagram of an example in-vehicle computing system in accordance with one or more embodiments of the present disclosure.

FIG. 9 shows a block diagram of an in-vehicle computing system 900 configured and/or integrated inside vehicle 901. In-vehicle computing system 900 may perform one or more of the methods described hereinabove in some embodiments. In some examples, the in-vehicle computing system 900 may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 901 in order to enhance an in-vehicle experience for a driver and/or a passenger.

In-vehicle computing system 900 may include one or more processors including an operating system processor 914 and an interface processor 920. Operating system processor 914 may execute an operating system on the in-vehicle computing system, and control input/output, display, playback, and other operations of the in-vehicle computing system. Interface processor 920 may interface with a vehicle control system 930 via an intra-vehicle communication module 922.

Intra-vehicle communication module 922 may output data to other vehicle systems 931 and vehicle control elements 961, while also receiving data input from other vehicle components and systems 931, 961, e.g., by way of vehicle control system 930. When outputting data, intra-vehicle communication module 922 may provide a signal via a bus corresponding to any status of the vehicle, the vehicle surroundings (e.g., as measured by one or more microphones or cameras mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system 900 may retrieve from the engine CAN bus the current speed of the vehicle estimated by the wheel sensors, a current location of the vehicle provided by the GPS sensors, and a current trajectory of the vehicle provided by one or more inertial measurement sensors in order to determine an estimated path of the vehicle. In addition, other interfacing means such as Ethernet may be used as well without departing from the scope of this disclosure.

A non-volatile storage device 908 may be included in in-vehicle computing system 900 to store data such as instructions executable by processors 914 and 920 in non-volatile form. The storage device 908 may store application data to enable the in-vehicle computing system 900 to perform any of the above-described methods and/or to run an application for connecting to a cloud-based server and/or collecting information for transmission to the cloud-based server. Connection to a cloud-based server may be mediated via extra-vehicle communication module 924. The application may retrieve information gathered by vehicle systems/sensors, input devices (e.g., user interface 918), devices in communication with the in-vehicle computing system (e.g., a mobile device connected via a Bluetooth link), etc. In-vehicle computing system 900 may further include a volatile memory 916. Volatile memory 716 may be random access memory (RAM). Non-transitory storage devices, such as non-volatile storage device 908 and/or volatile memory 916, may store instructions and/or code that, when executed by a processor (e.g., operating system processor 914 and/or interface processor 920), controls the in-vehicle computing system 900 to perform one or more of the actions described in the disclosure.

A microphone 902 may be included in the in-vehicle computing system 900 to measure ambient noise in the vehicle, to measure ambient noise outside the vehicle, etc. One or more additional sensors may be included in and/or communicatively coupled to a sensor subsystem 910 of the in-vehicle computing system 900. For example, the sensor subsystem 910 may include and/or be communicatively coupled to a camera, such as a rear view camera for assisting a user in parking the vehicle, a cabin camera for identifying a user, and/or a front view camera to assess quality of the route segment ahead. The above-described cameras may also be used to provide images to a computer vision-based traffic sign detection module, as described above. Sensor subsystem 910 of in-vehicle computing system 900 may communicate with and receive inputs from various vehicle sensors and may further receive user inputs. While certain vehicle system sensors may communicate with sensor subsystem 910 alone, other sensors may communicate with both sensor subsystem 910 and vehicle control system 930, or may communicate with sensor subsystem 910 indirectly via vehicle control system 930. Sensor subsystem 910 may serve as an interface (e.g., a hardware interface) and/or processing unit for receiving and/or processing received signals from one or more of the sensors described in the disclosure.

A navigation subsystem 911 of in-vehicle computing system 900 may generate and/or receive navigation information such as location information (e.g., via a GPS sensor and/or other sensors from sensor subsystem 910), route guidance, traffic information, point-of-interest (POI) identification, and/or provide other navigational services for the driver. The navigation subsystem 911 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 911 may communicate with motion and rotation sensors included in the sensor subsystem 910. Alternatively, the navigation subsystem 911 may include motion and rotation sensors and determine the movement and rotation based on the output of these sensors. Navigation subsystem 911 may transmit data to, and receive data from a cloud-based server and/or external navigation service via extra-vehicle communication module 924.

External device interface 912 of in-vehicle computing system 900 may be coupleable to and/or communicate with one or more external devices 940 located external to vehicle 901. While the external devices are illustrated as being located external to vehicle 901, it is to be understood that they may be temporarily housed in vehicle 901, such as when the user is operating the external devices while operating vehicle 901. In other words, the external devices 940 are not integral to vehicle 901. The external devices 940 may include a mobile device 942 (e.g., connected via a Bluetooth, NFC, WIFI direct, or other wireless connection) or an alternate Bluetooth-enabled device 952. Mobile device 942 may be a mobile phone, smart phone, wearable devices/sensors that may communicate with the in-vehicle computing system via wired and/or wireless communication, or other portable electronic device(s). Other external devices include external services 946. For example, the external devices may include extra-vehicular devices that are separate from and located externally to the vehicle. Still other external devices include external storage devices 954, such as solid-state drives, pen drives, USB drives, etc. External devices 940 may communicate with in-vehicle computing system 900 either wirelessly or via connectors without departing from the scope of this disclosure. For example, external devices 940 may communicate with in-vehicle computing system 900 through the external device interface 912 over network 960, a universal serial bus (USB) connection, a direct wired connection, a direct wireless connection, and/or other communication link.

One or more applications 944 may be operable on mobile device 942. As an example, mobile device application 944 may be operated to monitor an environment of the vehicle (e.g., collect audio and/or visual data of an environment of the vehicle) and/or to process audio and/or visual data received from vehicle sensors. The collected/processed data may be transferred by application 944 to external device interface 912 over network 960. Likewise, one or more applications 948 may be operable on external services 946. As an example, external services applications 948 may be operated to aggregate and/or analyze data from multiple data sources. For example, external services applications 948 may aggregate data from the in-vehicle computing system (e.g., sensor data, log files, user input, etc.), etc. The collected data may be transmitted to another device and/or analyzed by the application to determine a location of an emergency vehicle and/or to determine a suggested course of action for avoiding interference with the emergency vehicle.

Vehicle control system 930 may include controls for controlling aspects of various vehicle systems 931 involved in different in-vehicle functions. These may include, for example, controlling aspects of vehicle audio system 932 for providing audio output to the vehicle occupants. Audio system 932 may include one or more acoustic reproduction devices including electromagnetic transducers such as speakers. In some examples, the in-vehicle computing system may be the only audio source for the acoustic reproduction device or there may be other audio sources that are connected to the audio reproduction system (e.g., external devices such as a mobile phone) to produce audio outputs, such as one or more of the audible alerts described above. The connection of any such external devices to the audio reproduction device may be analog, digital, or any combination of analog and digital technologies.

Vehicle control system 930 may also include controls for adjusting the settings of various vehicle controls 961 (or vehicle system control elements) related to the engine and/or auxiliary elements within a cabin of the vehicle, such as steering controls 962, brake controls 963, lighting controls 964 (e.g., cabin lighting, external vehicle lighting, light signals). For example, the vehicle control system 930 may include controls for adjusting the vehicle controls 961 to present one or more of the above-described alerts (e.g., adjusting cabin lighting, automatically controlling steering or braking to perform a maneuver in accordance with a detected traffic sign, etc.). Vehicle controls 961 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system (e.g., to provide the above-described alert). The control signals may also control audio output (e.g., an audible alert) at one or more speakers of the vehicle's audio system 932.

In-vehicle computing system 900 may further include an antenna(s) 906, which may be communicatively coupled to external device interface 912 and/or extra-vehicle communication module 924. The in-vehicle computing system may receive positioning signals such as GPS signals and/or wireless commands via antenna(s) 906 or via infrared or other mechanisms through appropriate receiving devices.

One or more elements of the in-vehicle computing system 900 may be controlled by a user via user interface 918. User interface 918 may include a graphical user interface presented on a touch screen, and/or user-actuated buttons, switches, knobs, dials, sliders, etc. A user may also interact with one or more applications of the in-vehicle computing system 900 and mobile device 942 via user interface 918. Notifications and other messages (e.g., alerts), as well as navigational assistance, may be displayed to the user on a display of the user interface. User preferences/information and/or responses to presented alerts may be performed via user input to the user interface.

In some examples, the detection of a projected object may be indicated via the user interface 918 so that the operator of the vehicle may be informed of the projected object. Further, in such examples, the user interface 918 may further enable the operator to confirm whether the object is a projected object or a real object. In this way, additional feedback may be provided for further improving the depth estimation network and/or the object detection networks of the camera perception ECU described hereinabove.

The disclosure provides for a system for a vehicle, the system including an image sensor, a processor, and a storage device storing instructions executable by the processor to capture, via the image sensor, an image of an environment of the vehicle, detect an object in the image of the environment of the vehicle, determine whether the object is a projected image of the object, and selectively control one or more vehicle systems of the vehicle to perform one or more actions if the object is not the projected image. In a first example of the system, the storage device further stores instructions executable by the processor to not selectively control the one or more vehicle systems of the vehicle to perform the one or more actions if the object is the projected image. In a second example of the system optionally including the first example, the storage device further stores instructions executable by the processor to: estimate a depth of the object in the image, and determine that the object is not the projected image of the object if the estimated depth is non-zero. In a third example of the system optionally including one or more of the first and second examples, the storage device further stores instructions executable by the processor to: classify the object in the image as a traffic sign board, and determine that the object is not the projected image of the object if the estimated depth is zero. In a fourth example of the system optionally including one or more of the first through third examples, the storage device further stores instructions executable by the processor to: authenticate the traffic sign board as a valid traffic sign board to determine that the object is not the projected image if the estimated depth is zero. In a fifth example of the system optionally including one or more of the first through fourth examples, the storage device stores a depth estimation neural network configured to accept the image as input and generate the estimated depth as output, wherein the storage device further stores instructions executable by the processor to input the image to the depth estimation neural network to estimate the depth of the object in the image. In a sixth example of the system optionally including one or more of the first through fifth examples, the storage device stores a relative camera pose neural network trained to accept two consecutive images from the image sensor, the two consecutive images including the image and a second image, and output a relative camera pose between the two consecutive images. In a seventh example of the system optionally including one or more of the first through sixth examples, the storage device further stores instructions executable by the processor to: estimate, with the depth estimation neural network, a second depth of the second image; estimate, with the relative camera pose neural network, the relative camera pose between the two consecutive images; transform the depth to a warped depth based on the relative camera pose; interpolate the second depth to an interpolated depth based on the relative camera pose; and update the depth estimation neural network based on a depth inconsistency between the warped depth and the interpolated depth. In an eighth example of the system optionally including one or more of the first through seventh examples, the storage device further stores instructions executable by the processor to output a notification, to an operator of the vehicle via a user interface, indicating that the object is a projected object if the object is the projected image.

The disclosure also provides for a method for a vehicle, the method including capturing, via an image sensor, an image of an environment of the vehicle, detecting, with a first neural network, an object in the image, determining, with a second neural network, whether the object is a projected image of the object, selectively controlling one or more vehicle systems of the vehicle to perform one or more actions if the object is not the projected image, and not selectively controlling the one or more vehicle systems of the vehicle to perform the one or more actions if the object is the projected image. In a first example of the method, determining whether the object is the projected image of the object comprises estimating, with the second neural network, a depth of the object in the image, and determining that the object is not the projected image if the depth is non-zero. In a second example of the method optionally including the first example, the method further includes classifying, with the first neural network, a type of the object, wherein determining whether the object is the projected image of the object further comprises determining that the object is the projected image if the depth is zero and the type of the object is not classified as a traffic sign board. In a third example of the method optionally including one or more of the first and second examples, determining whether the object is the projected image of the object further comprises determining that the object is not the projected image if the depth is zero and the type of the object is classified as the traffic sign board. In a fourth example of the method optionally including one or more of the first through third examples, the method further includes capturing, with the image sensor, a second image of the environment of the vehicle, estimating, with the second neural network, depths of the second image, estimating, with a third neural network, a relative camera pose between the image and the second image, transforming the depth of the image and the depths of the second image to a same three-dimensional structure based on the relative camera pose, determining a depth inconsistency between the transformed depth of the image and the transformed depths of the second image, and updating the second neural network based on the depth inconsistency. In a fifth example of the method optionally including one or more of the first through fourth examples, the method further includes determining, with the updated second neural network for a subsequent image acquired via the image sensor, whether an object in the subsequent image is a projected image.

The disclosure also provides for a method for a vehicle, the method including capturing, via an image sensor, an image of an environment of the vehicle, detecting, with a first neural network, an object in the image, estimating, with a second neural network, a depth of the object in the image, determining, based on the estimated depth of the object, whether the object is a projected image of the object, selectively controlling one or more vehicle systems of the vehicle to perform one or more actions if the object is not the projected image, and not selectively controlling the one or more vehicle systems of the vehicle to perform the one or more actions if the object is the projected image. In a first example of the method, the method further includes classifying, with the first neural network, the object as a traffic sign board, and authenticating a validity of the object as the traffic sign board if the estimated depth is zero. In a second example of the method optionally including the first example, the method further includes performing unsupervised training of the second neural network to update the second neural network in near real-time based on the estimated depth of the object in the image. In a third example of the method optionally including one or more of the first and second examples, performing unsupervised training of the second neural network to update the second neural network in real-time based on the estimated depth of the object in the image includes capturing, via the image sensor, a second image of the environment of the vehicle, estimating, with the second neural network, depths of the second image, determining a depth inconsistency between depth of the object in the image and the depths of the second image, and updating the second neural network based on the depth inconsistency. In a fourth example of the method optionally including one or more of the first through third examples, the method further includes estimating, with a third neural network, a relative camera pose between the image and the second image, and transforming the depth of the image and the depths of the second image to a same three-dimensional structure based on the relative camera pose, wherein determining the depth inconsistency based on the depth of the object in the image and the depths of the second images comprises determining the depth inconsistency between the transformed depth of the object in the image and the transformed depths of the second image.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 900 described with reference to FIG. 9. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A system for a vehicle, comprising:
   an image sensor;
   a processor; and
   a non-transitory storage device storing instructions executable by the processor to:
   capture, via the image sensor, an image of an environment of the vehicle;
   detect an object in the image of the environment of the vehicle;
   determine whether the object is a projected image of the object;
   selectively control one or more vehicle systems of the vehicle to perform one or more actions wherein the object is not the projected image; and
   authenticate the traffic sign board as a valid traffic sign board to determine that the object is not the projected image wherein the estimated depth is zero.

2. The system of claim 1, wherein the non-transitory storage device further stores instructions executable by the processor to not selectively control the one or more vehicle systems of the vehicle to perform the one or more actions wherein the object is the projected image.

3. The system of claim 1, wherein the non-transitory storage device further stores instructions executable by the processor to: estimate a depth of the object in the image, and determine that the object is not the projected image of the object wherein the estimated depth is non-zero.

4. The system of claim 3, wherein the storage device further stores instructions executable by the processor to: classify the object in the image as a traffic sign board, and determine that the object is not the projected image of the object wherein the estimated depth is zero.

5. The system of claim 3, wherein the non-transitory storage device stores a depth estimation neural network configured to accept the image as input and generate the estimated depth as output, wherein the non-transitory storage device further stores instructions executable by the processor to: input the image to the depth estimation neural network to estimate the depth of the object in the image.

6. The system of claim 5, wherein the non-transitory storage device stores a relative camera pose neural network trained to accept two consecutive images from the image sensor, the two consecutive images including the image and a second image, and output a relative camera pose between the two consecutive images.

7. The system of claim 6, wherein the non-transitory storage device further stores instructions executable by the processor to:
   estimate, with the depth estimation neural network, a second depth of the second image;
   estimate, with the relative camera pose neural network, the relative camera pose between the two consecutive images;
   transform the depth to a warped depth based on the relative camera pose;
   interpolate the second depth to an interpolated depth based on the relative camera pose; and
   update the depth estimation neural network based on a depth inconsistency between the warped depth and the interpolated depth.

8. The system of claim 1, wherein the non-transitory storage device further stores instructions executable by the processor to output a notification, to an operator of the vehicle via a user interface, indicating that the object is a projected object wherein the object is the projected image.

9. A method for a vehicle, comprising:
   capturing, via an image sensor, an image of an environment of the vehicle;
   detecting, with a first neural network, an object in the image;
   determining, with a second neural network, whether the object is a projected image of the object;
   selectively controlling one or more vehicle systems of the vehicle to perform one or more actions wherein the object is not the projected image;
   not selectively controlling the one or more vehicle systems of the vehicle to perform the one or more actions wherein the object is the projected image; and
   outputting a notification, to an operator of the vehicle via a user interface, indicating that the object is a projected object wherein the object is the projected image.

10. The method of claim 9, wherein determining whether the object is the projected image of the object comprises:
    estimating, with the second neural network, a depth of the object in the image; and
    determining that the object is not the projected image wherein the depth is non-zero.

11. The method of claim 10, further comprising classifying, with the first neural network, a type of the object, wherein determining whether the object is the projected image of the object further comprises determining that the object is the projected image wherein the depth is zero and the type of the object is not classified as a traffic sign board.

12. The method of claim 11, wherein determining whether the object is the projected image of the object further comprises determining that the object is not the projected image wherein the depth is zero and the type of the object is classified as the traffic sign board.

13. The method of claim 10, further comprising:
capturing, with the image sensor, a second image of the environment of the vehicle;
estimating, with the second neural network, depth of the second image;
estimating, with a third neural network, a relative camera pose between the image and the second image;
transforming the depth of the image and the depths of the second image to a same three-dimensional structure based on the relative camera pose;
determining a depth inconsistency between the transformed depth of the image and the transformed depths of the second image; and
updating the second neural network based on the depth inconsistency.

14. The method of claim 13, further comprising determining, with the updated second neural network for a subsequent image acquired via the image sensor, whether an object in the subsequent image is a projected image.

15. A method for a vehicle, comprising:
capturing, via an image sensor, an image of an environment of the vehicle;
detecting, with a first neural network, an object in the image;
estimating, with a second neural network, a depth of the object in the image;
determining, based on the estimated depth of the object, whether the object is a projected image of the object;
classifying, with the first neural network, the object as a traffic sign board, and authenticating a validity of the object as the traffic sign board wherein the estimated depth is zero;
selectively controlling one or more vehicle systems of the vehicle to perform one or more actions wherein the object is not the projected image; and
not selectively controlling the one or more vehicle systems of the vehicle to perform the one or more actions wherein the object is the projected image.

16. The method of claim 15, further comprising performing unsupervised training of the second neural network to update the second neural network in near real-time based on the estimated depth of the object in the image.

17. The method of claim 16, wherein performing unsupervised training of the second neural network to update the second neural network in real-time based on the estimated depth of the object in the image comprises:
capturing, via the image sensor, a second image of the environment of the vehicle;
estimating, with the second neural network, depth of the second image;
determining a depth inconsistency between depth of the object in the image and the depths of the second image; and
updating the second neural network based on the depth inconsistency.

18. The method of claim 17, further comprising:
estimating, with a third neural network, a relative camera pose between the image and the second image; and
transforming the depth of the image and the depth of the second image to a same three-dimensional structure based on the relative camera pose,
wherein determining the depth inconsistency based on the depth of the object in the image and the depths of the second image comprises determining the depth inconsistency between the transformed depth of the object in the image and the transformed depths of the second image.

* * * * *